United States Patent
Carlson et al.

(10) Patent No.: US 7,836,714 B2
(45) Date of Patent: Nov. 23, 2010

(54) THERMAL STORAGE TANK/BASE

(75) Inventors: David G. Carlson, Charlotte, NC (US); Kurt A. Dimos, Mocksville, NC (US)

(73) Assignee: Ingersoll-Rand Company, Montvale, NJ (US)

( * ) Notice: Subject to any disclaimer, the term of this patent is extended or adjusted under 35 U.S.C. 154(b) by 828 days.

(21) Appl. No.: 11/415,626

(22) Filed: May 2, 2006

(65) Prior Publication Data

US 2006/0266073 A1 Nov. 30, 2006

Related U.S. Application Data

(60) Provisional application No. 60/685,255, filed on May 27, 2005.

(51) Int. Cl.
*F28F 1/14* (2006.01)

(52) U.S. Cl. .......................................... 62/183; 62/506

(58) Field of Classification Search ................... 62/506, 62/434, 93, 97, 172, 178, 185, 401, 65, 272, 62/183; 55/179; 96/111; 165/163, 164, 165/168, 184

See application file for complete search history.

(56) References Cited

U.S. PATENT DOCUMENTS

| | | | |
|---|---|---|---|
| 263,620 A | | 8/1882 | Sturgeon |
| 1,654,735 A | * | 1/1928 | Keeling ................... 261/122.1 |
| 2,160,077 A | * | 5/1939 | Maiuri ........................ 62/643 |
| 2,175,469 A | | 10/1939 | Kaufman |
| 2,360,468 A | * | 10/1944 | Brown .......................... 62/656 |
| 2,680,355 A | | 6/1954 | Colomb |
| 2,911,513 A | | 11/1959 | MacCracken |
| 3,080,706 A | | 3/1963 | Flynn, Jr. et al. |
| 3,122,899 A | * | 3/1964 | Costantini et al. ............. 62/419 |
| 3,144,314 A | * | 8/1964 | Jackson ........................ 96/111 |
| 3,152,877 A | | 10/1964 | Kaufman |
| 3,453,809 A | | 7/1969 | Henderson |
| 3,486,523 A | * | 12/1969 | Mullings ..................... 137/271 |
| 3,494,138 A | | 2/1970 | Bird |
| 3,835,918 A | | 9/1974 | Pilarczyk |
| 4,287,724 A | * | 9/1981 | Clark .......................... 62/272 |
| 4,490,993 A | * | 1/1985 | Larriva ........................ 62/304 |
| 5,118,262 A | | 6/1992 | Kuo |
| 5,315,938 A | * | 5/1994 | Freller ......................... 110/233 |
| 5,505,121 A | | 4/1996 | Spector |

(Continued)

FOREIGN PATENT DOCUMENTS

DE 296 08952 8/1996

(Continued)

*Primary Examiner*—Mohammad M Ali
(74) *Attorney, Agent, or Firm*—Michael Best & Friedrich LLP

(57) ABSTRACT

A fluid compression system includes a compressor that is operable to produce a flow of compressed fluid and a coolant compressor that is operable to produce a flow of coolant. A base includes at least one polymer wall that at least partially defines a reservoir space. The base supports the compressor and the coolant compressor. A first tube is at least partially positioned within the reservoir space and is in fluid communication with the compressor to receive the flow of compressed air and a second tube is at least partially positioned within the reservoir space and is in fluid communication with the coolant compressor to receive the flow of coolant.

31 Claims, 14 Drawing Sheets

U.S. PATENT DOCUMENTS

| | | |
|---|---|---|
| 6,341,830 B1 * | 1/2002 | Chun ...................... 312/406.2 |
| 6,593,525 B1 | 7/2003 | Vanderhoof et al. |
| 6,616,719 B1 | 9/2003 | Sun et al. |
| 6,793,701 B2 | 9/2004 | Sun et al. |
| 6,895,774 B1 | 5/2005 | Ares et al. |
| 2005/0067137 A1 | 3/2005 | Barnwell |

FOREIGN PATENT DOCUMENTS

| | | |
|---|---|---|
| EP | 0344351 | 12/1989 |

* cited by examiner

THERMAL STORAGE TANK/BASE

RELATED APPLICATION DATA

This application claims priority to co-pending U.S. Provisional Patent Application Ser. No. 60/685,255 filed on May 27, 2005 and incorporated herein by reference.

BACKGROUND

The present invention relates to a refrigerated air dryer. More particularly, the invention relates to a refrigerated air dryer that includes a base that also functions as a tank.

Refrigerated air dryers are used to remove water vapor from compressed air systems. Some refrigerated air dryers cycle the power on and off in response to the compressed air load on the dryer. Generally, these dryers are referred to as cyclic dryers. One type of cycling dryer is a heat absorbing mass dryer. In some mass dryers, the compressed air stream is routed through a tank filled with a water-glycol mixture. The compressed air stream is cooled by the water-glycol mixture to condense water vapor from the air stream.

Heat absorbing mass dryers are generally larger than other types of dryers and include thermal storage tanks. The thermal storage tanks require structural support that often requires the tank to be elevated. In addition, the tanks must be insulated to inhibit condensate formation on the exterior of the tank and prevent heat transfer from the ambient air.

SUMMARY

The invention provides a thermal storage tank for a heat absorbing mass dryer. The tank also serves as a base that supports the components of the mass dryer system. In preferred constructions, the base is formed from a polymer material.

In one embodiment, the invention provides a fluid compression system that includes a compressor that is operable to produce a flow of compressed fluid and a coolant compressor that is operable to produce a flow of coolant. A base includes at least one polymer wall that at least partially defines a reservoir space. The base supports the compressor and the coolant compressor. A first tube is at least partially positioned within the reservoir space and is in fluid communication with the compressor to receive the flow of compressed air and a second tube is at least partially positioned within the reservoir space and is in fluid communication with the coolant compressor to receive the flow of coolant.

In another embodiment, the invention provides a fluid compression system that includes a compressor operable to produce a flow of compressed fluid and a coolant compressor operable to produce a flow of coolant. The fluid compression system includes a floor and at least one polymer wall coupled to the floor to define a reservoir space. The polymer wall at least partially supports the compressor and the coolant compressor. A first tube is at least partially positioned within the reservoir space and is in fluid communication with the compressor to receive the flow of compressed air and a second tube is at least partially positioned within the reservoir space and in fluid communication with the coolant compressor to receive the flow of coolant. A heat transfer fluid is disposed within the reservoir space to thermally couple the first tube and the second tube.

In another embodiment, the invention provides a fluid compression system that includes a compressor operable to produce a flow of compressed fluid and a coolant compressor operable to produce a flow of coolant. The fluid compression system includes a base integrally formed as a single piece to define a reservoir space. The base supports the compressor and the coolant compressor. A first tube is at least partially positioned within the reservoir space and is in fluid communication with the compressor to receive the flow of compressed air and a second tube is at least partially positioned within the reservoir space and is in fluid communication with the coolant compressor to receive the flow of coolant. A heat transfer fluid is disposed within the reservoir space to thermally couple the first tube and the second tube.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
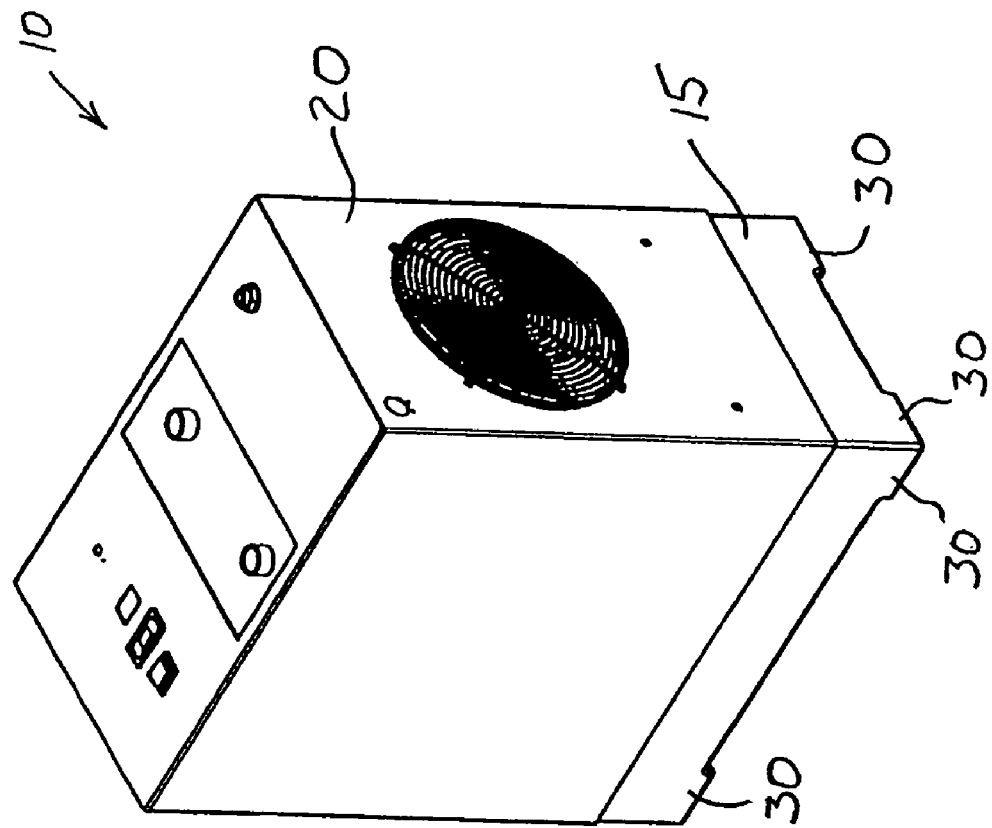
FIG. 1 is a perspective view of a refrigerated air dryer including a tank.

FIG. 1 illustrates an air dryer system 10 that includes a tank/base 15 that functions as both a tank and a base 15. Due to the duel function of the tank/base 15, the component may be referred to herein as a tank 15, a base 15, and/or a tank/base 15. An enclosure 20 surrounds many of the internal components that are supported by the base 15. Generally, the enclosure 20 inhibits the entry of dirt, water, dust, debris, and other unwanted particles or substances.

Figure 2:
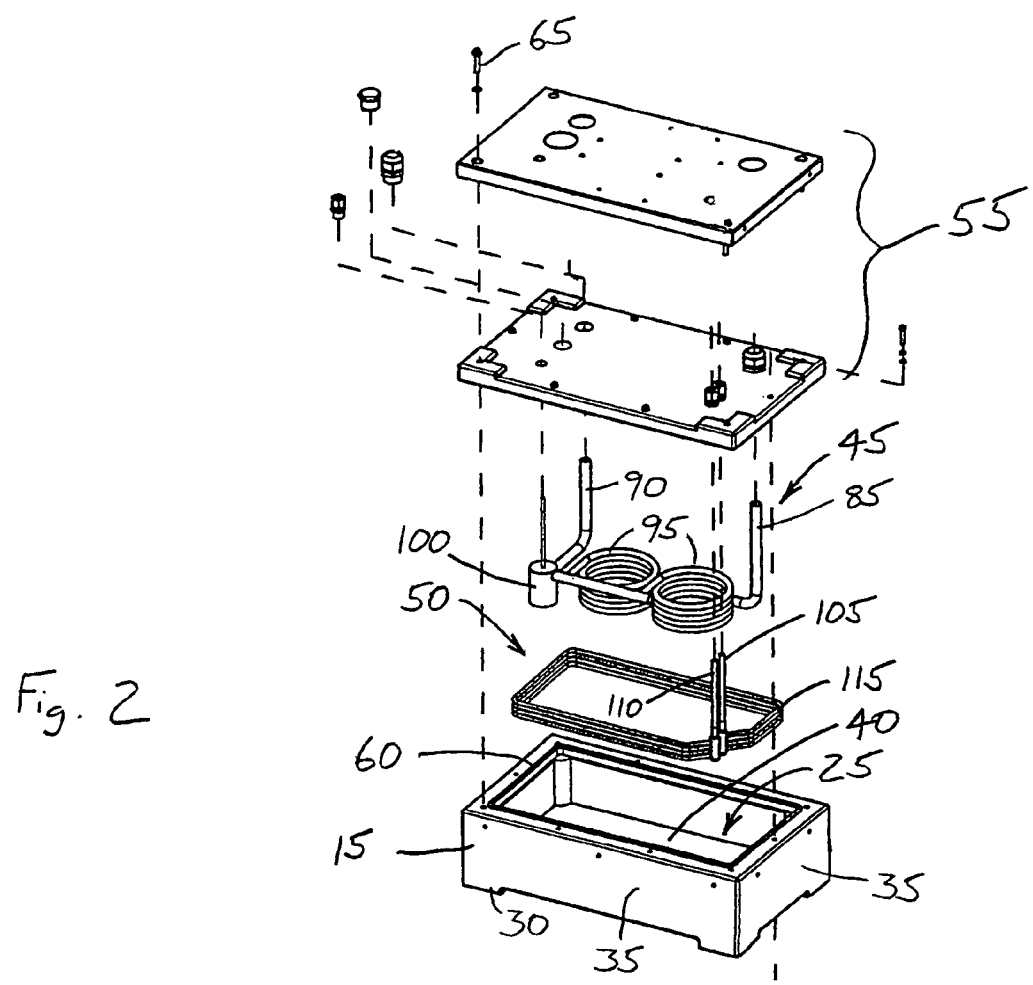
FIG. 2 is an exploded perspective view of a portion of the air dryer and the tank of FIG. 1.

As shown in FIG. 2, the tank 15 is a substantially rectangular component that defines a space 25. The tank 15 includes four extensions 30, one at each corner, that function as feet to support the tank 15 on the ground or floor. The tank 15 also includes four walls 35 and a floor portion 40 that cooperate to define the space 25. The four walls 35 also cooperate to define an open top that is sized to receive an air tube assembly 45 and a refrigerant tube assembly 50. As one of ordinary skill in the art will realize, the actual shape of the tank 15 can vary greatly depending on the application. For example, an oval or elliptical tank that includes only a single continuous wall could be employed if desired. In addition, L-shaped or irregular shaped tanks could also be employed if desired. Such tanks would generally require two, three, four, or five or more walls to define the space 25. Thus, the invention should not be limited to rectangular tanks 15 alone.

A base plate 55 attaches to the tank 15 to substantially cover and close the open top. In some constructions a gasket, o-ring, or other sealing device 60 is positioned between the base plate 55 and the walls 35 of the tank 15 to assure an adequate seal. In the illustrated construction, fasteners in the form of bolts 65 attach the base plate 55 to the tank 15. Of course, other constructions may use other attachment systems. For example, one construction uses an adhesive or a welding process to fixedly bond the base plate 55 to the tank 15. In still another construction, a cam arrangement is used. The cam arrangement allows a partial rotation of a cam member to fully engage the base plate 55 and the tank 15. As one of ordinary skill will realize, there are many different systems available to attach the base plate 55 to the tank 15.

In preferred constructions, the tank 15 is formed from a polymer such as a thermoplastic material or a thermosetting material. In addition, some constructions may introduce fibers (e.g., polyester, glass, carbon, etc.) into a thermoplastic or thermosetting plastic to produce a plastic composite that is suitable for use in manufacturing the tank 15. Any suitable manufacturing process could be employed to manufacture the tanks 15 including but not limited to rotomolding, injection molding, thermal forming, and the like.

Other constructions of the tank 15 may include other materials. For example, composite materials, ceramic materials, other plastics, or metals may also be suitable for use in forming portions of the tank 15 or the entire tank 15 depending on the particular application.

Figure 15:
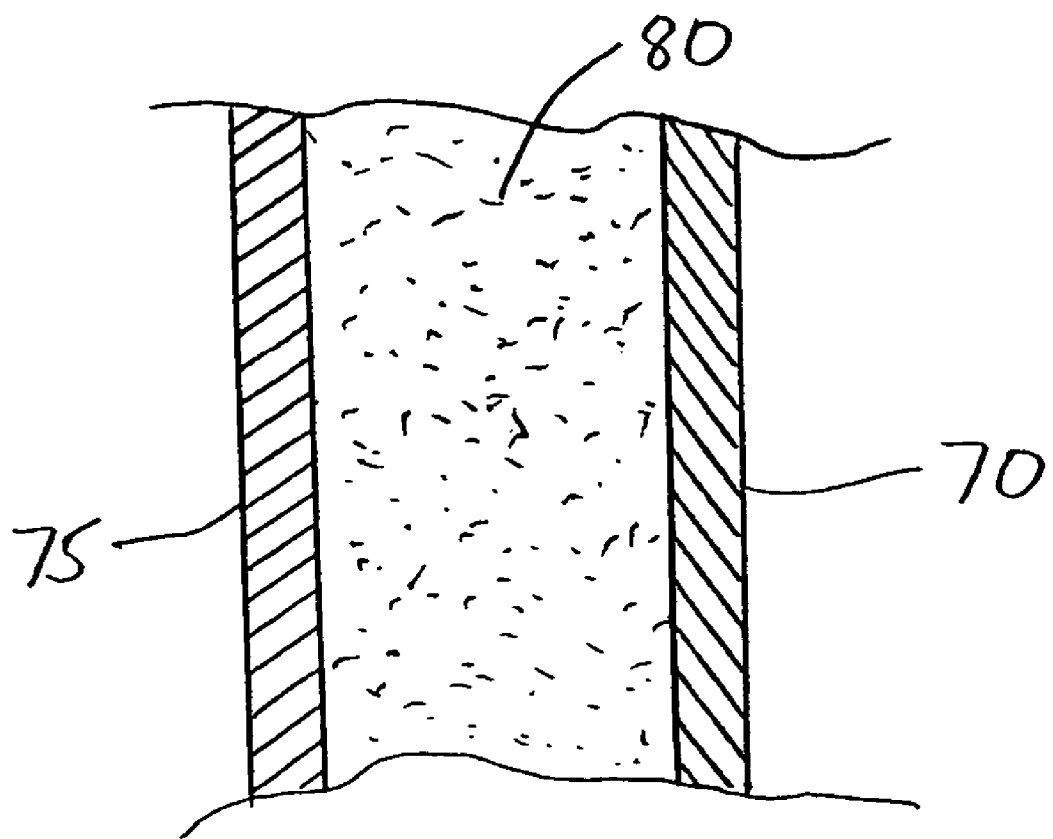
FIG. 15 is a cross section of a portion of a wall of a tank including insulation material between an inner skin and an outer skin.

FIG. 15 illustrates a construction of a tank wall 35 in which insulating material is formed as part of the wall 35. In the construction of FIG. 15, an outer skin 70 and an inner skin 75 are formed from a polymer as described above. However, a layer of insulation 80 is positioned between the inner skin 75 and the outer skin 70 to enhance the insulative properties of the tank 15. The polymer skins 70, 75 are thick enough to provide the necessary structural support for the tank 15. In still other constructions, additional structural members, such as a metal frame may also be positioned between the polymer skins 70, 75 to form an integrated composite tank 15.

In most constructions, the tank 15 is filled with a water-glycol mixture or other solution that facilitates heat transfer between the air tube 45 and the refrigerant tube 50. Thus, the tank 15 must be strong enough to support the weight of the liquid within the tank 15 as well as any components positioned on the base plate 55. However, unlike prior tanks in similar applications, the use of the polymer material to form the tank 15 reduces or eliminates the need for insulation on the tank as the tank 15 material functions as a suitable insulator.

With continued reference to FIG. 2, the air tube 45 includes an inlet portion 85, an outlet portion 90, two coil portions 95, and a moisture chamber 100. The refrigerant tube 50 includes an inlet portion 105, an outlet portion 110, and a coil portion 115. In the illustrated construction, the refrigerant tube 50 extends around the outer perimeter of the space 25 of the tank 15 and the air tube 45 fits within the refrigerant tube assembly 50. The moisture chamber 100 is positioned near the outlet portion 90 of the air tube 45 such that as the air rises to exit the tank 15, the heavier water particles fall to the bottom of the moisture chamber 100 where they can be drawn from the system 10. It should be noted that some constructions eliminate the moisture chamber 100.

Figure 3:
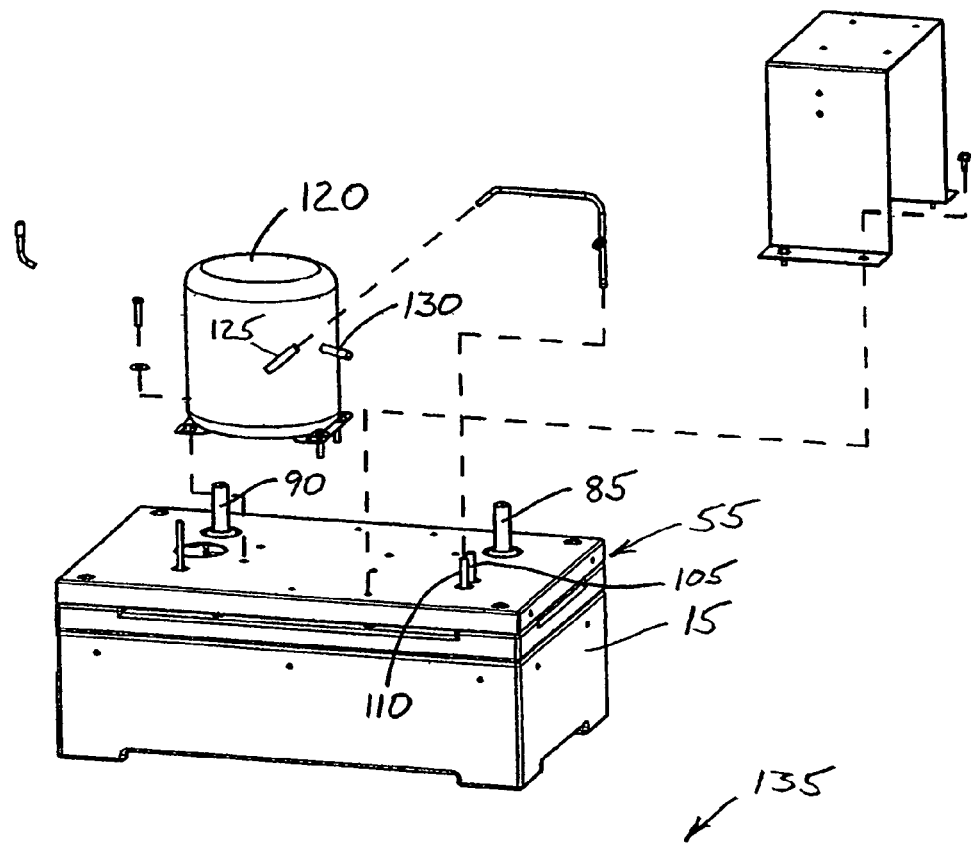
FIG. 3 is an exploded perspective view of a portion of the air dryer and the tank of FIG. 1.

Turning to FIGS. 3-13 the air dryer will be described in one possible order of assembly. With reference to FIG. 3, the tank 15 is illustrated in an assembled state such that the air tube 45 and the refrigerant tube 50 are disposed within the tank 15. The inlet and outlet portions 85, 90, 105, 110 of the air tube 45 and the refrigerant tube 50 extend above the attached base plate 55 to facilitate attachment to the remaining components. A refrigerant compressor 120 attaches to the base plate 55 and may include any suitable compressor (e.g., screw, scroll, gear, centrifugal, reciprocating, and the like) operable to compress a refrigerant (e.g., Freon, R-12, ammonia, etc.). As illustrated in FIG. 3, the compressor 120 includes an inlet 125 that is coupled to the outlet portion 110 of the refrigerant tube 50 via a tube. Thus, the compressor 120 is able to draw refrigerant from the refrigerant tube 50 for compression during system operation. The compressor 120 also includes an outlet 130 that facilitates the discharge of high-pressure high-temperature refrigerant from the compressor 120.

Figure 4:
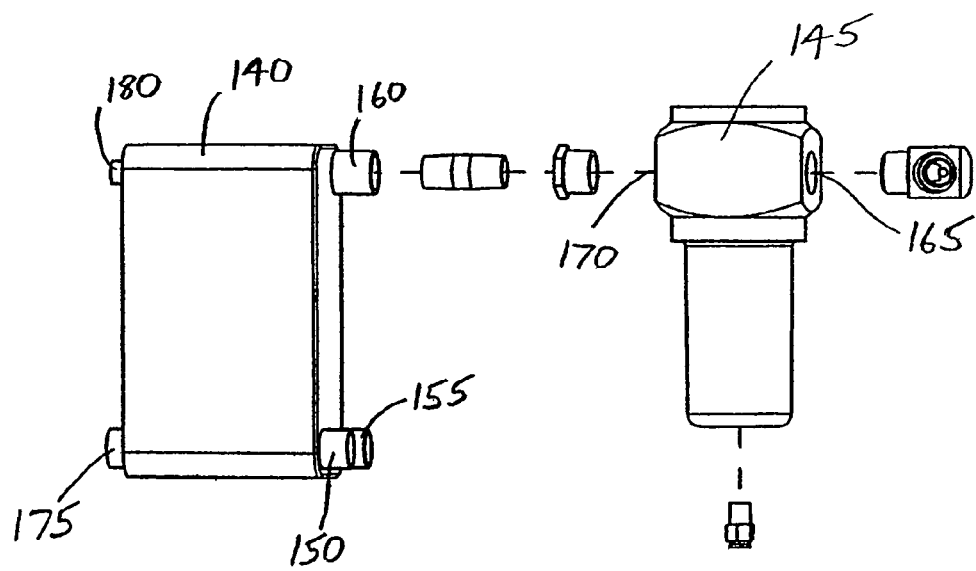
FIG. 4 is an exploded perspective view of a portion of the air dryer of FIG. 1.
Figure 5:
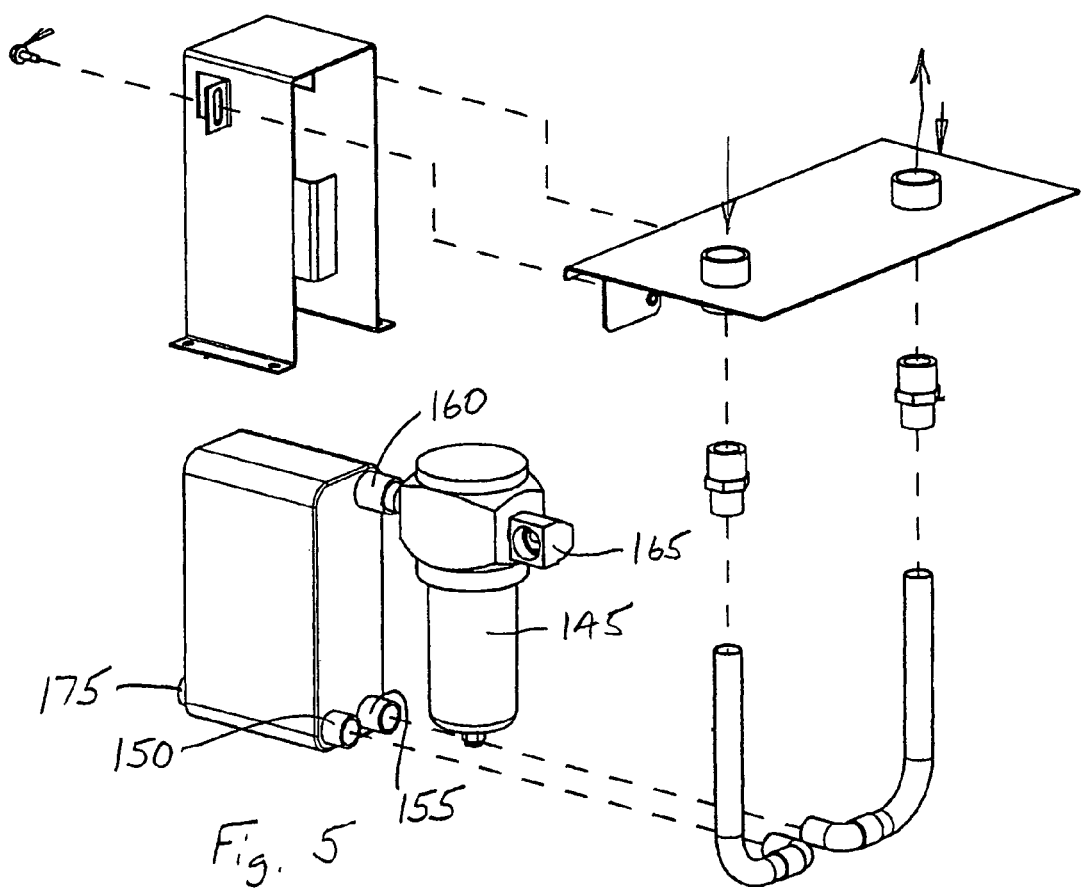
FIG. 5 is an exploded perspective view of a portion of the air dryer of FIG. 1.
Figure 6:
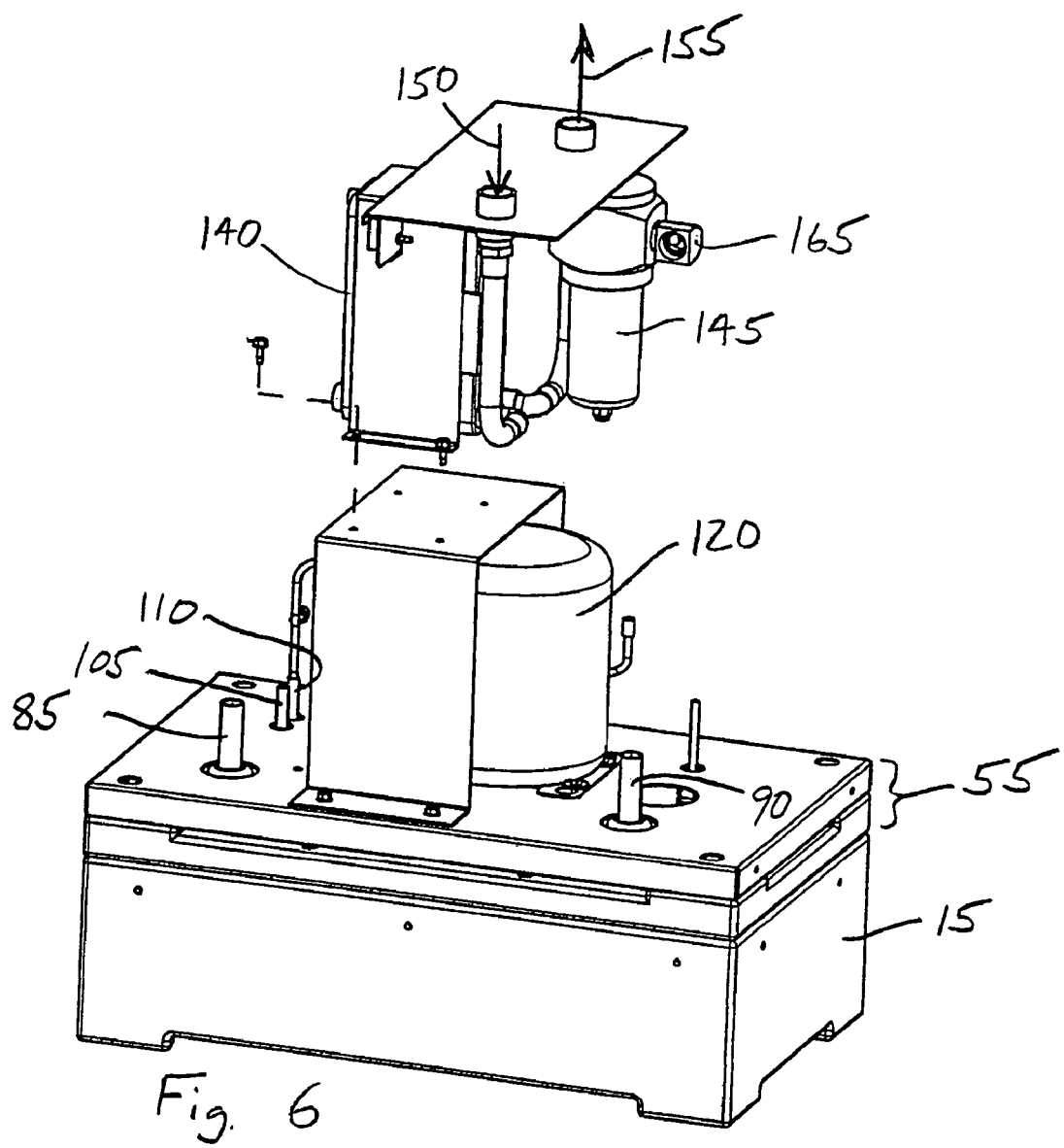
FIG. 6 is an exploded perspective view of a portion of the air dryer and the tank of FIG. 1.
Figure 8:
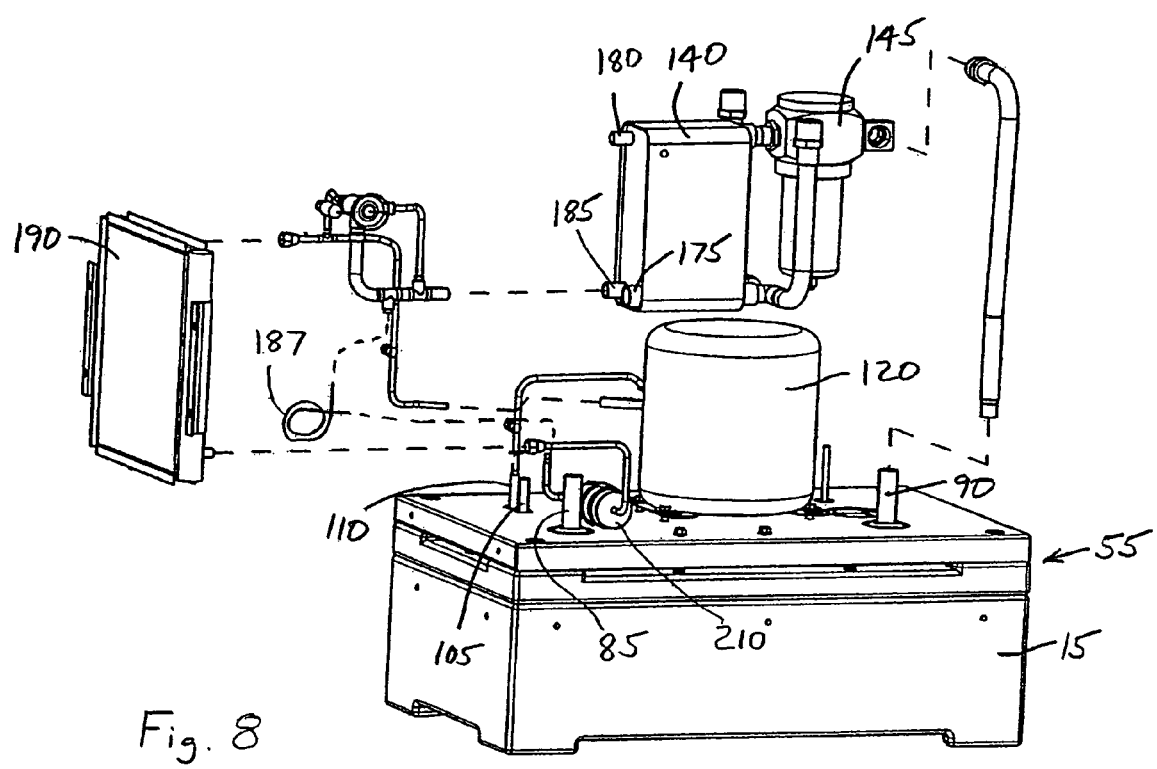
FIG. 8 is an exploded perspective view of a portion of the air dryer and the tank of FIG. 1.
Figure 9:
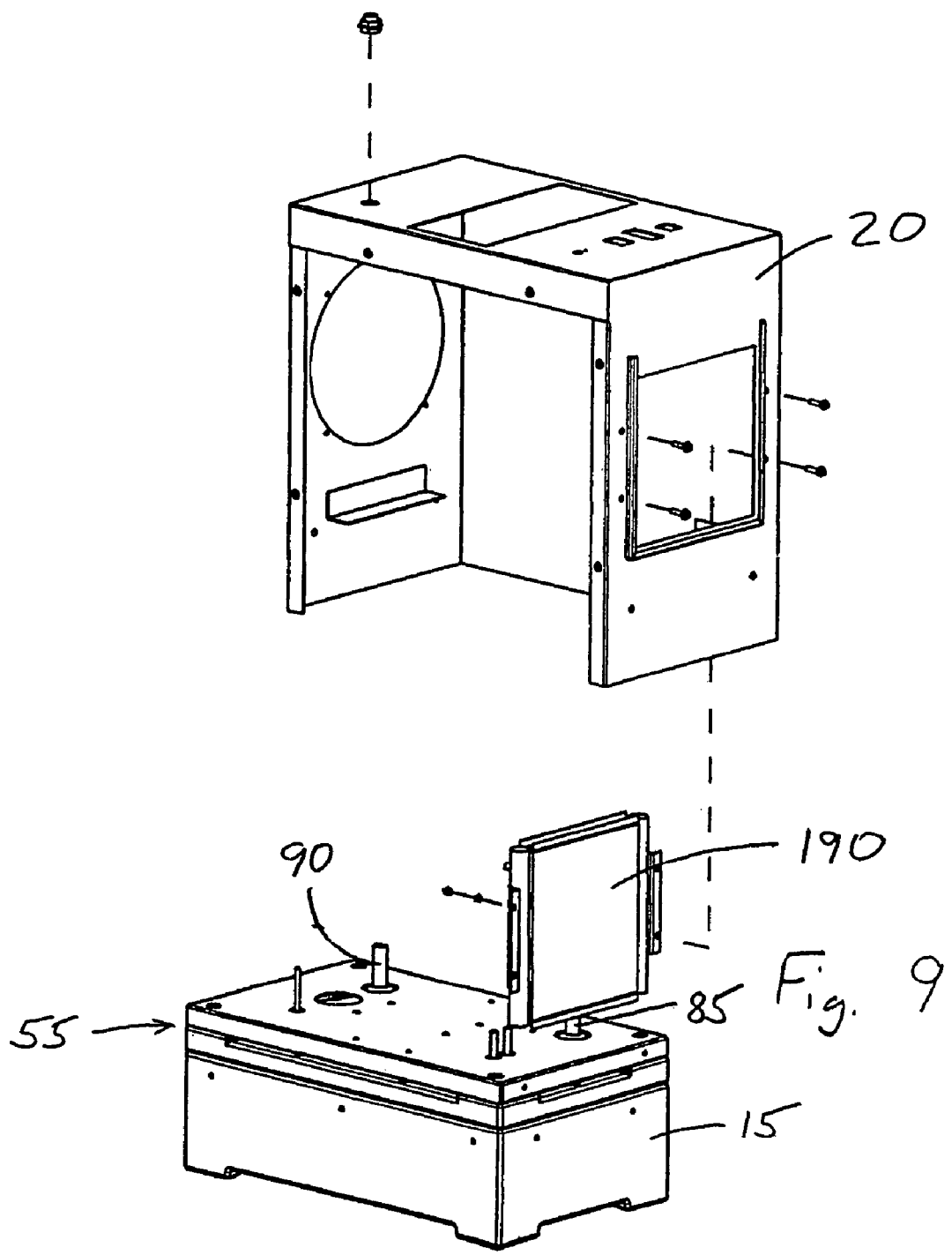
FIG. 9 is an exploded perspective view of a portion of the air dryer and the tank of FIG. 1.
Figure 10:
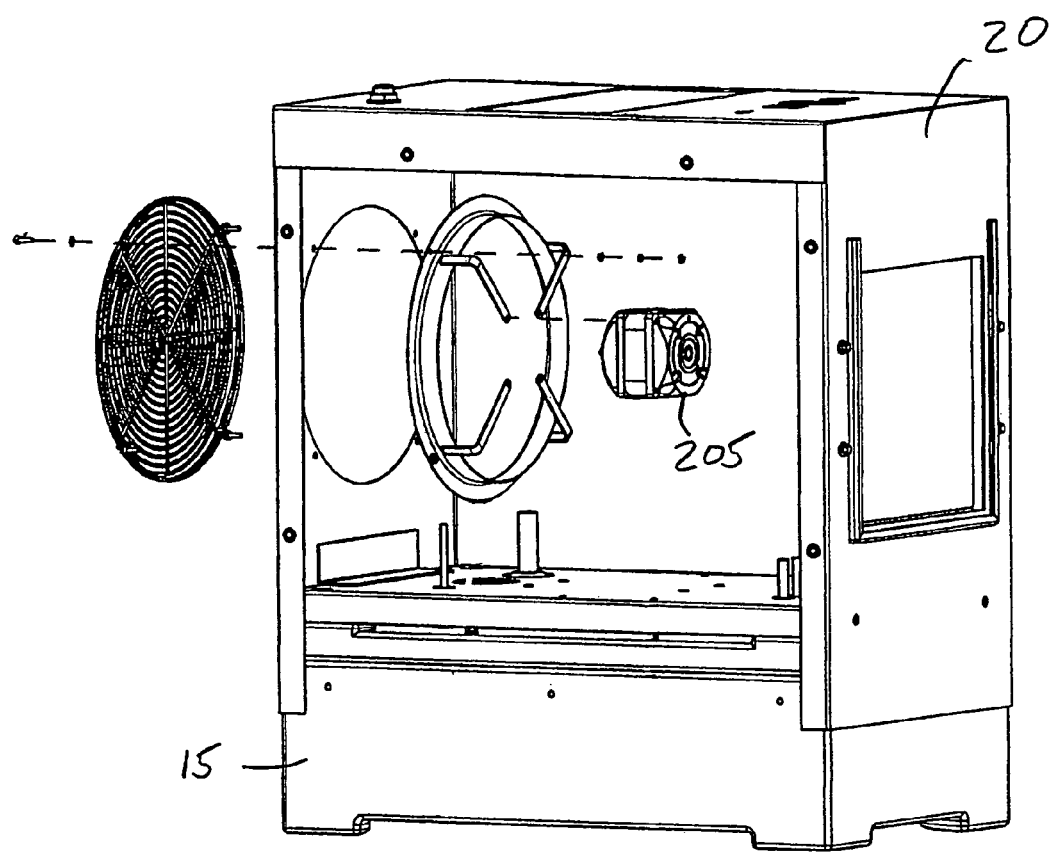
FIG. 10 is an exploded perspective view of a portion of the air dryer and the tank of FIG. 1.
Figure 11:
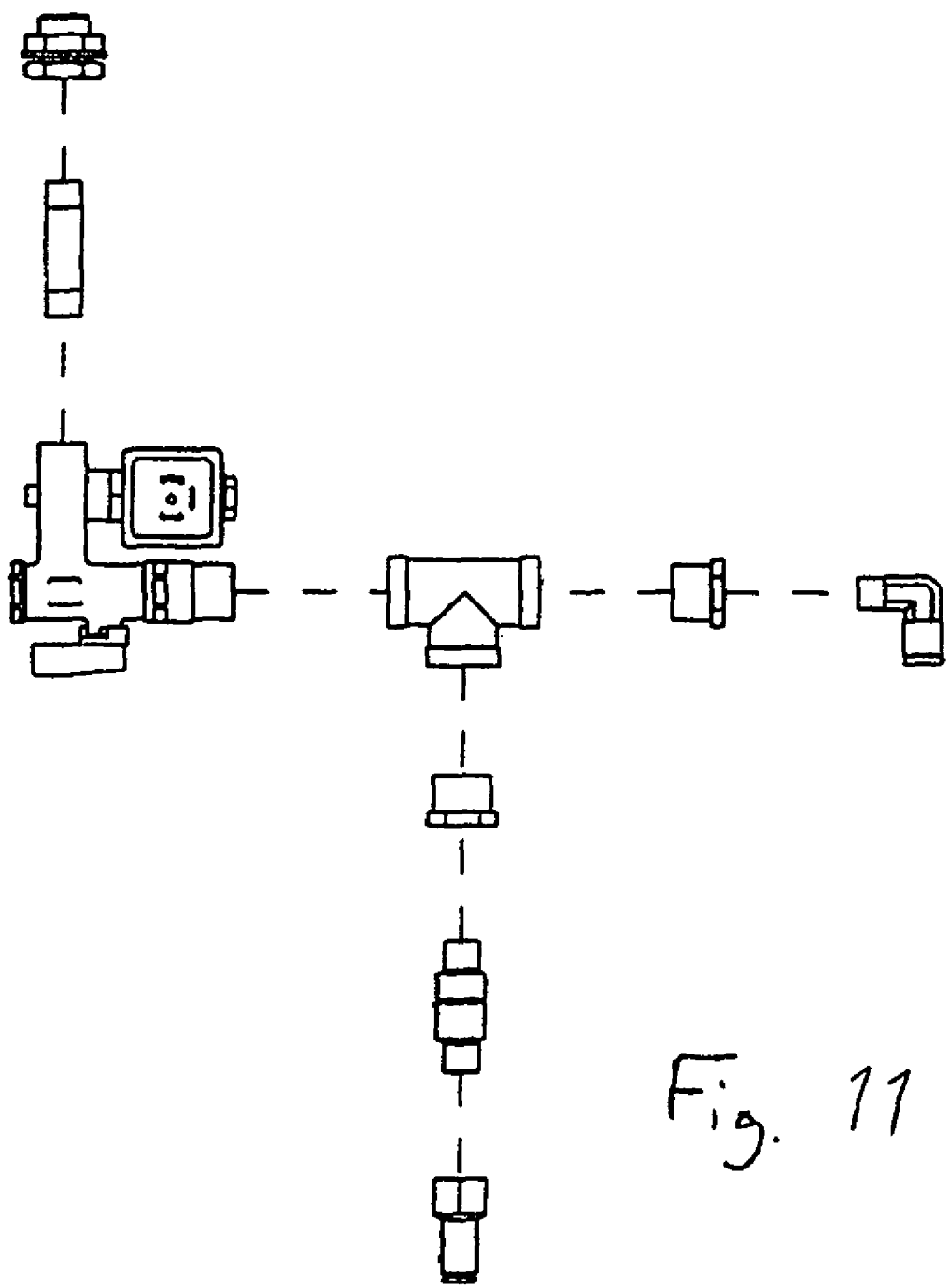
FIG. 11 is an exploded perspective view of a portion of the air dryer of FIG. 1.
Figure 12:
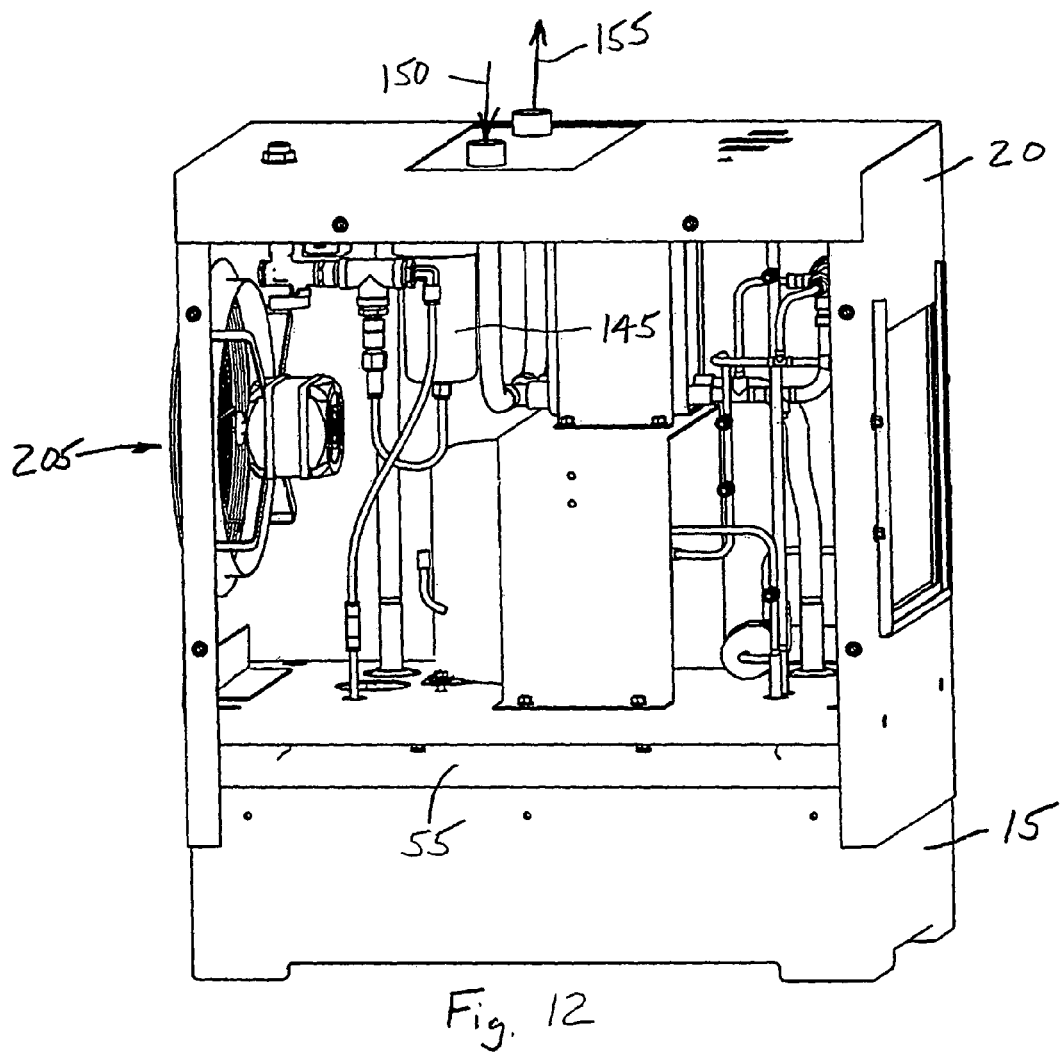
FIG. 12 is a perspective view of a portion of the air dryer and the tank of FIG. 1, with a portion of the enclosure removed.
Figure 13:
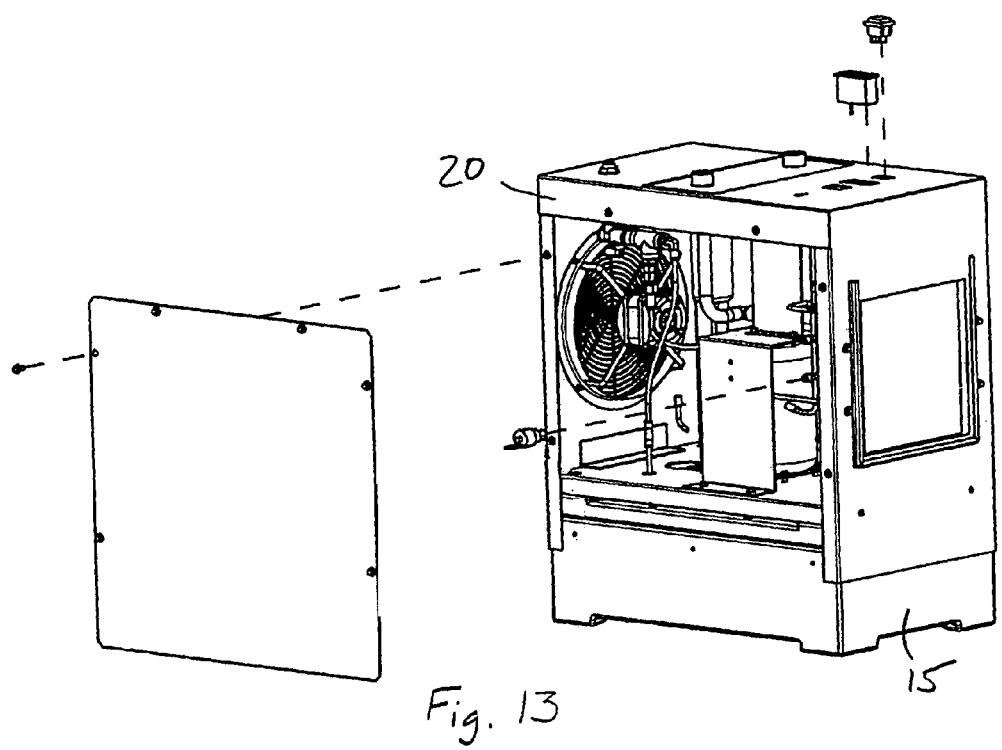
FIG. 13 is an exploded perspective view of a portion of the air dryer and the tank of FIG. 1.

With reference to FIG. 4, a portion of an evaporator assembly 135 that includes a heat exchanger 140 and a moisture separator 145 is illustrated. Before proceeding, it should be noted that the tank 15, the air tube 45 and the refrigerant tube 50 described with regard to FIG. 2 also may be considered part of the evaporator assembly 135. It is in these components that the refrigerant cools the air flowing through the system 10. As such, these components together function much like the evaporator of a standard refrigeration system. As shown in FIGS. 4 and 5, the heat exchanger 140 includes a wet air inlet 150, a dry air outlet 155, and a dry air inlet 160. The moisture separator 145 includes an inlet 165 that receives air from the outlet portion 90 of the air tube 45 and an outlet 170 that connects to the dry air inlet 160. As illustrated in FIG. 8, a pipe or tube extends between the outlet portion 90 of the air tube 45 and the inlet 165 of the moisture separator 145 to direct air from the air tube 45 to the moisture separator 145. As is known in the art, the moisture separator 145 may include a filter element or other device that separate water from the air stream as the air flows through the moisture separator 145. As shown in FIG. 6, the heat exchanger/moisture separator assembly attaches to a support above the compressor 120.

Figure 7:
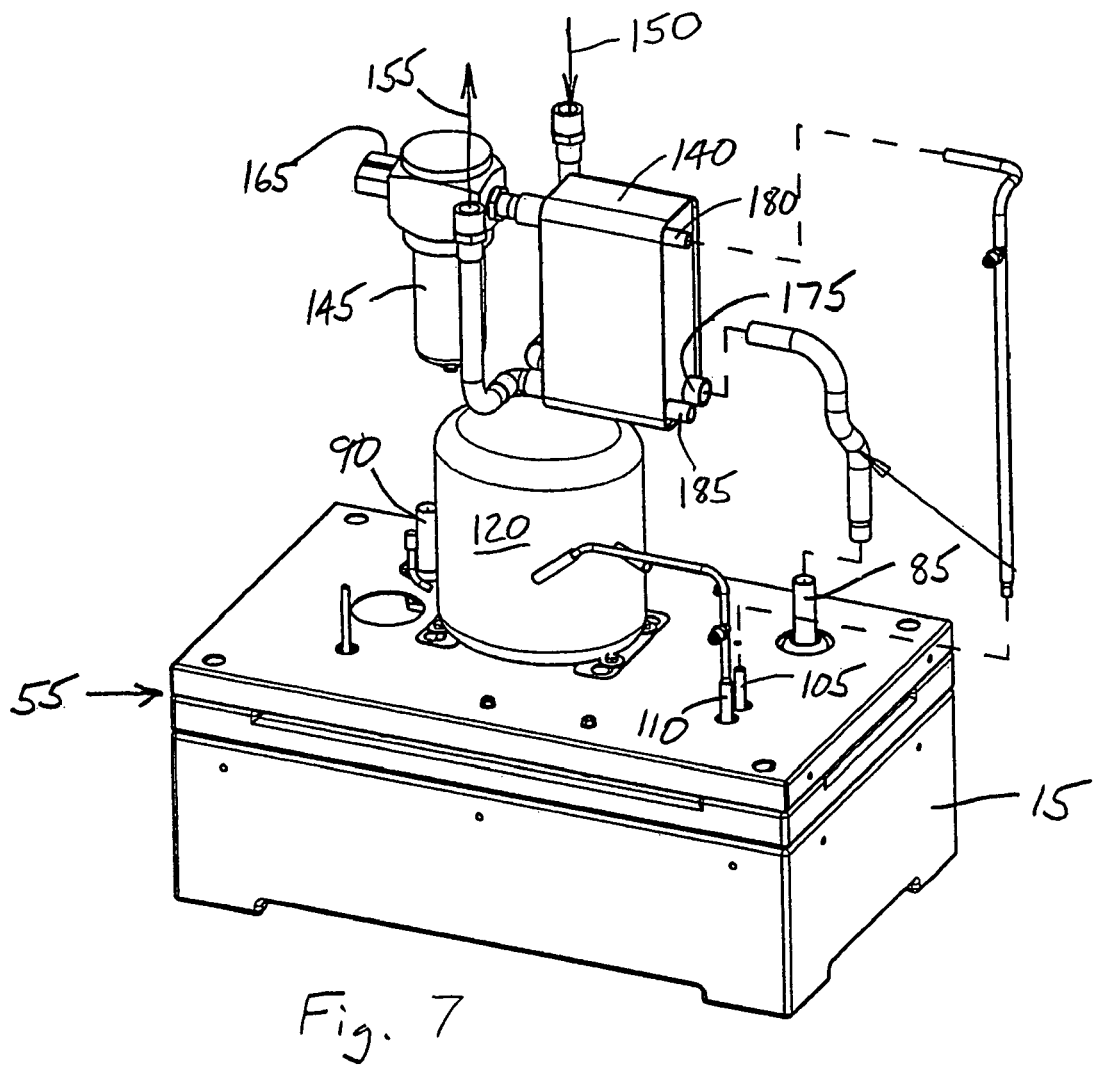
FIG. 7 is an exploded perspective view of a portion of the air dryer and the tank of FIG. 1.

Turning to FIG. 7, the heat exchanger 140 is illustrated from the opposite side as is shown in FIGS. 4-6. The heat exchanger 140 includes a wet air outlet 175 that directs air via a pipe to the air tube inlet portion 85. The heat exchanger 140 also includes a refrigerant outlet 180 that directs refrigerant from the heat exchanger 140 through a tube to the refrigerant tube inlet portion 105. A refrigerant inlet 185, shown in FIG. 8, receives refrigerant from an expansion device 187 (shown in FIG. 8) and directs the refrigerant through the heat exchanger 140 to the refrigerant outlet 180. The expansion device 187 can be a capillary tube expansion device or could also include an orifice, a thermostatic expansion valve, a constant pressure expansion valve, or another expansion device.

With continued reference to FIG. 8, high-pressure, high-temperature refrigerant flows from the compressor outlet 130 to a condenser 190 that attaches to the base plate 55. The refrigerant enters the condenser 190 via a refrigeration inlet 195 and exits the condenser 190 via a refrigerant outlet 200. The condenser 190 is a heat exchanger that exchanges heat between the flow of high-pressure high temperature refrigerant and a flow of relatively cool air. In most constructions, a finned-tube heat exchanger is employed with other heat exchangers also being suitable for use with the present invention. In most constructions, a motor driven fan 205, shown in FIGS. 10 and 12-14, moves air from outside of the enclosure 20 through the condenser 190.

The condenser outlet 200 connects to a refrigeration tubing assembly 210, shown in FIG. 8, which functions as an expansion device to allow the refrigerant to expand and cool. Generally, the refrigerant tubing assembly 210 includes a quantity of tubing that provides the expansion effect. The refrigerant leaves the refrigerant tubing assembly 210 and enters the expansion device 187. From the expansion device 187 the refrigerant enters the heat exchanger 140 via inlet 185. After passing through the heat exchanger, the refrigerant exits via the outlet 180 and enters the inlet portion 105 of the refrigerant tube 50 within the tank 15.

Figure 14:
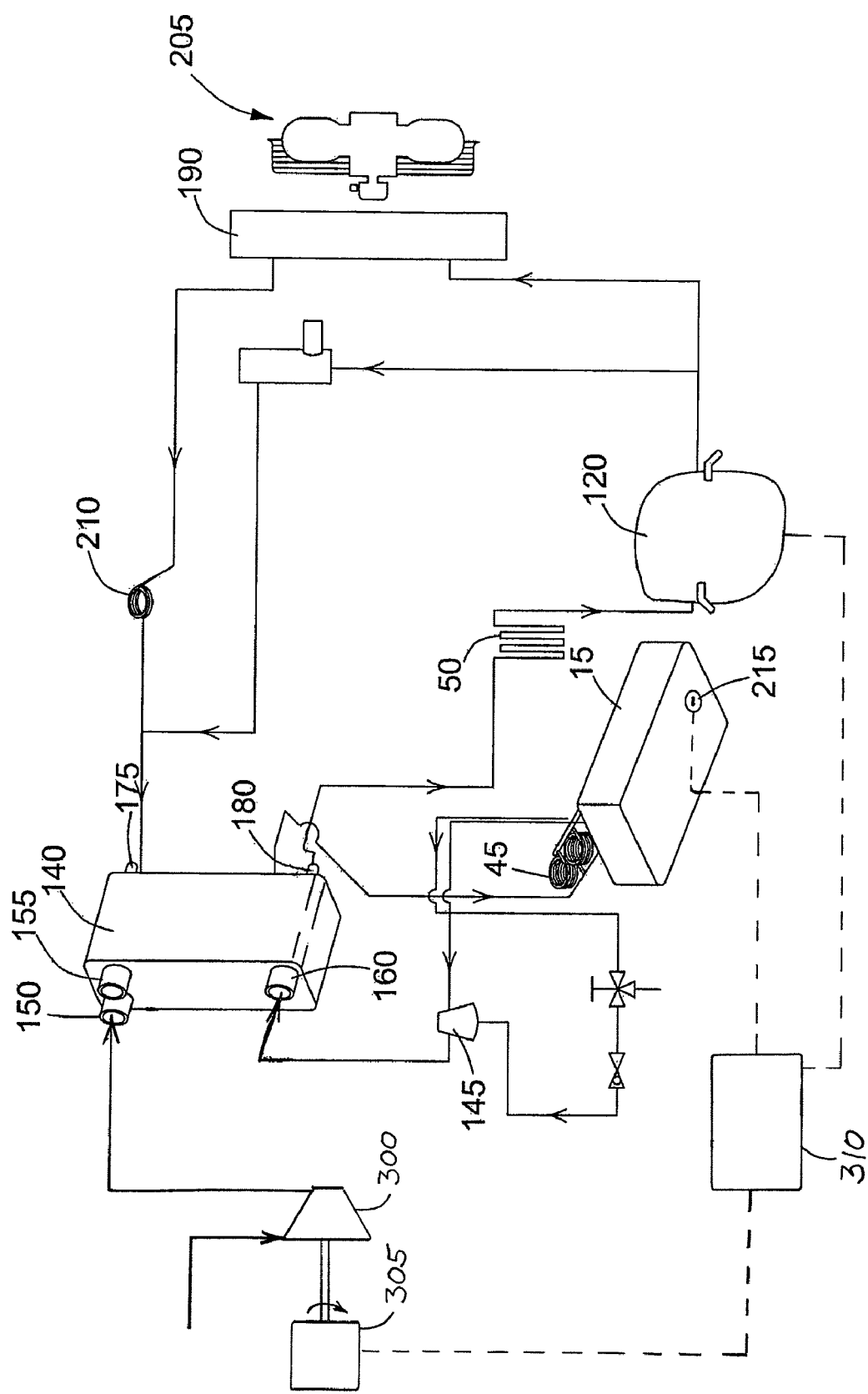
FIG. 14 is a piping and instrument diagram (P&ID) illustrating some of the flow paths of the air dryer of FIG. 1.

The function of the air dryer 10 will be described with reference to FIG. 14. The air dryer 10 includes two flows, the flow of air and the flow of refrigerant. During operation, an air compressor 300 is driven by a prime mover 305 and delivers high-pressure air to the air dryer 10. The compressed air is generally saturated and contains some water vapor. The wet air enters the heat exchanger 140, flows through the heat exchanger 140, and exits via the wet air outlet 175. From the wet air outlet 175, the wet air enters the air tube 45 through the inlet portion 85 of the air tube 45. The wet air flows through the coil portions 95 of the air tube 45 and is cooled as will be described. The air enters the outlet portion 90 of the air tube 45 where some condensed water is left in the moisture chamber 100. The partially dried compressed air flows upward to the moisture separator inlet 165. The air then flows through the moisture separator 145 where additional condensed water is removed from the flow of compressed air. The dry air then exits the moisture separator 145 and enters the heat exchanger 140 via the dry air inlet 160. The air flows through the heat exchanger 145 to the dry air outlet 155 where the air is directed out of the dryer 10 for use.

The refrigerant flow begins at the compressor 120 where compressor operation increases the pressure and temperature of the refrigerant. The high pressure refrigerant flow is then split into two flow paths. One of the flow paths flows through the condenser 190 where the refrigerant is cooled. The cooled refrigerant then flows through the refrigeration tubing assembly 210 where it expands. As the refrigerant expands, the pressure and temperature of the refrigerant drop. The second flow of refrigerant bypasses, the condenser 190 and is expanded before rejoining the first flow to define a low pressure low temperature flow of refrigerant. By dividing the flow, the system is able to control the temperature and pressure of the refrigerant after the two flow streams recombine to prevent ice formation in the evaporator. The low pressure low temperature flow then enters the heat exchanger 140, flows through the heat exchanger 140, and enters the refrigerant tube 50 via the inlet portion 105 of the refrigerant tube 50. The refrigerant flows through the coil portion 115 of the refrigerant tube 50 to draw heat from the solution disposed within the tank 15. The refrigerant is then drawn from the refrigerant tube 50 via the outlet portion 110 to the compressor 120 to begin the cycle again.

Thus, the refrigerant functions to cool the solution (e.g., water-glycol solution). The solution in turn cools the air flowing through the coil portions 95 of the air tube 45. As the air within the air tube 45 cools, water vapor trapped in the compressed air begins to condense and fall out of the air stream in the form of water droplets. In constructions that employ the moisture chamber 100, many of the droplets become trapped in the moisture chamber 100, as they are too heavy to rise up the outlet portion 90 of the air tube 45 with the air. Thus, some of the condensing moisture is trapped within the moisture chamber 100. The air then enters the moisture separator 145 where condensed water is separated from the air stream.

After the air passes through the moisture separator 145, the dry air flows through the heat exchanger 140. The cool dry air is heated by the hot (wet) compressed air that also flow through the heat exchanger 140. The air is heated to a temperature that is well above the dew point of the compressed air to reduce the likelihood of water condensation within the compressed air stream during use. The re-heating also serves to pre-cool the air before it enters the evaporator, thereby reducing the required size of the refrigeration system.

In preferred constructions, a thermostat 215 or other temperature sensor is positioned to measure the temperature of the solution within the tank 15. A control system 310 can be employed to maintain the temperature and the coldest air temperature within the tank 15 at a predetermined level. The temperature of the solution can be controlled in two ways. First, as shown in FIG. 14 the entire refrigeration system can be cycled on and off. When off, no refrigerant flows to the solution and the solution begins to warm. Second, the portion of refrigerant that flows to the condenser 190 during operation can be varied to vary the temperature of the refrigerant that flows to the tank 15. Thus, the system is able to control the bulk temperature of the solution to provide the amount of drying desired for the particular air stream.

Thus, the invention provides, among other things, a new and useful air dryer system. More particularly, the invention provides a new and useful tank/base arrangement for a refrigerated air dryer system.

What is claimed is:

1. A fluid compression system comprising:

a compressor operable to produce a flow of compressed fluid;

a coolant compressor operable to produce a flow of coolant;

a base including a floor portion and at least one polymer wall that surrounds a perimeter of the floor portion to at least partially define a reservoir space at least partially filled with a liquid such that the wall and the floor are exposed to the hydrostatic pressure of the liquid during operation, the base supporting the compressor and the coolant compressor during operation;

a first tube at least partially positioned within the reservoir space and in fluid communication with the compressor to receive the flow of compressed fluid, the first tube including a moisture chamber;

a second tube at least partially positioned within the reservoir space and in fluid communication with the coolant compressor to receive the flow of coolant; and a heat exchanger and a moisture separator supported by the base and in fluid communication with the first tube and the second tube.

2. The fluid compression system of claim 1, wherein the base includes a floor portion and wherein the floor portion and the at least one polymer wall are integrally formed as a single piece using a polymer material.

3. The fluid compression system of claim 1, a heat transfer fluid disposed within the reservoir space to thermally couple the first tube and the second tube.

4. The fluid compression system of claim 1, wherein the first tube includes a first coil portion and the second tube includes a second coil portion.

5. The fluid compression system of claim 4, wherein the first coil portion is disposed inside of the second coil portion.

6. The fluid compression system of claim 4, wherein the first coil portion includes the moisture chamber that collects condensate from the flow of compressed fluid.

7. The fluid compression system of claim 1, further comprising a control system operable to control at least one of the compressor and the coolant compressor, the control system including a temperature sensor positioned to measure a temperature within the reservoir space.

8. The fluid compression system of claim 7, wherein the control system deactivates the coolant compressor in response to a sensed temperature below a first temperature and activates the coolant compressor in response to a sensed temperature above a second temperature.

9. The fluid compression system of claim 7, wherein the sensor measures the temperature of the liquid disposed within the reservoir.

10. The fluid compression system of claim 1, wherein the at least one polymer wall includes an inner skin and an outer skin spaced apart from one another to define an insulative space.

11. The fluid compression system of claim 10, further comprising insulation disposed within the insulative space.

12. A fluid compression system including a compressor that is operable to produce a flow of compressed fluid and a coolant compressor that is operable to produce a flow of coolant, the fluid compression system comprising:
a floor;
at least one polymer wall coupled to the floor to substantially enclose a reservoir space, the polymer wall at least partially supporting the compressor and the coolant compressor;
a first tube at least partially positioned within the reservoir space and in fluid communication with the compressor to receive the flow of compressed fluid, the first tube including a moisture chamber;
a second tube at least partially positioned within the reservoir space and in fluid communication with the coolant compressor to receive the flow of coolant;
a heat transfer liquid contained within the reservoir space to thermally couple the first tube and the second tube, the liquid in direct contact with the at least one polymer wall and the floor; and
a heat exchanger including a moisture separator supported by the base and in fluid communication with the first tube and the second tube.

13. The fluid compression system of claim 12, wherein the floor and the at least one polymer wall are integrally formed as a single piece using a polymer material.

14. The fluid compression system of claim 12, wherein the first tube includes a first coil portion and the second tube includes a second coil portion.

15. The fluid compression system of claim 14, wherein the first coil portion is disposed inside of the second coil portion.

16. The fluid compression system of claim 14, wherein the first coil portion includes the moisture chamber that collects condensate from the flow of compressed fluid.

17. The fluid compression system of claim 12, further comprising a control system operable to control at least one of the compressor and the coolant compressor, the control system including a temperature sensor positioned to measure a temperature.

18. The fluid compression system of claim 17, wherein the control system deactivates the coolant compressor in response to a sensed temperature below a first temperature and activates the coolant compressor in response to a sensed temperature above a second temperature.

19. The fluid compression system of claim 17, wherein the sensor measures the temperature of the heat transfer liquid.

20. The fluid compression system of claim 12, wherein the at least one polymer wall includes an inner skin and an outer skin spaced apart from one another to define an insulative space.

21. The fluid compression system of claim 20, further comprising insulation disposed within the insulative space.

22. A fluid compression system including a compressor that is operable to produce a flow of compressed fluid and a coolant compressor that is operable to produce a flow of coolant, the fluid compression system comprising:
a base including a floor portion and at least one wall integrally formed as a single piece to define a reservoir space, the base supporting the compressor and the coolant compressor;
a first tube including a moisture chamber at least partially positioned within the reservoir space and in fluid communication with the compressor to receive the flow of compressed fluid;
a second tube at least partially positioned within the reservoir space and in fluid communication with the coolant compressor to receive the flow of coolant;
a heat transfer liquid disposed within the reservoir space to thermally couple the first tube and the second tube, the heat transfer liquid being in direct contact with the base; and
a heat exchanger and a moisture separator supported by the base and in fluid communication with the first tube and the second tube.

23. The fluid compression system of claim 22, wherein the base includes a polymer material.

24. The fluid compression system of claim 22, wherein the first tube includes a first coil portion and the second tube includes a second coil portion.

25. The fluid compression system of claim 24, wherein the first coil portion is disposed inside of the second coil portion.

26. The fluid compression system of claim 24, wherein the first coil portion includes the moisture chamber that collects condensate from the flow of compressed fluid.

27. The fluid compression system of claim 22, further comprising a control system operable to control at least one of the compressor and the coolant compressor, the control system including a temperature sensor positioned to measure a temperature.

28. The fluid compression system of claim 27, wherein the control system deactivates the coolant compressor in response to a sensed temperature below a first temperature and activates the coolant compressor in response to a sensed temperature above a second temperature.

29. The fluid compression system of claim 27, wherein the sensor measures the temperature of the heat transfer liquid.

30. The fluid compression system of claim 22, wherein the base includes at least one polymer wall that has an inner skin and an outer skin spaced apart from one another to define an insulative space.

31. The fluid compression system of claim 30, further comprising insulation disposed within the insulative space.

* * * * *